US008228939B1

(12) United States Patent
Moulsley et al.

(10) Patent No.: US 8,228,939 B1
(45) Date of Patent: Jul. 24, 2012

(54) RADIO COMMUNICATION SYSTEM

(75) Inventors: Timothy J. Moulsley, Caterham (GB); Bernard Hunt, Red Hill (GB)

(73) Assignees: U.S. Philips Corporation, Andover, MA (US); Sharp Corporation, Osaka (JP)

( * ) Notice: Subject to any disclaimer, the term of this patent is extended or adjusted under 35 U.S.C. 154(b) by 363 days.

(21) Appl. No.: 09/630,896

(22) Filed: Aug. 2, 2000

(30) Foreign Application Priority Data

Aug. 3, 1999 (GB) .................................... 9918130.7
Sep. 14, 1999 (GB) .................................... 9921548.5

(51) Int. Cl.
*H04J 3/02* (2006.01)

(52) U.S. Cl. ..... 370/462; 370/329; 370/341; 370/395.4; 370/432; 370/437; 370/442; 370/447; 370/461; 455/515; 455/522

(58) Field of Classification Search .................. 455/68, 455/69, 515, 522; 370/329, 322, 335, 341, 370/431–432, 468, 332, 337, 252, 342, 347, 370/320, 321, 441, 442, 395.4, 447, 461, 370/462
See application file for complete search history.

(56) References Cited

U.S. PATENT DOCUMENTS

| 5,528,664 | A |   | 6/1996 | Slekys et al. ..................... 379/58 |
| 5,638,412 | A | * | 6/1997 | Blakeney et al. .............. 375/377 |
| 5,822,311 | A | * | 10/1998 | Hassan et al. .................. 370/322 |
| 5,838,686 | A | * | 11/1998 | Ozkan ............................ 370/433 |
| 5,940,763 | A | * | 8/1999 | Alperovich et al. ........... 455/450 |
| 6,028,851 | A | * | 2/2000 | Persson et al. ................. 370/329 |
| 6,064,661 | A | * | 5/2000 | Benn .............................. 370/329 |
| 6,122,291 | A | * | 9/2000 | Robinson et al. .............. 370/468 |
| 6,167,283 | A | * | 12/2000 | Korpela et al. ................ 455/525 |
| 6,226,279 | B1 | * | 5/2001 | Hansson et al. ............... 370/329 |
| 6,389,056 | B1 | * | 5/2002 | Kanterakis et al. ............ 375/130 |
| 6,400,954 | B1 | * | 6/2002 | Khan et al. ..................... 455/450 |
| 6,498,785 | B1 | * | 12/2002 | Derryberry et al. ........... 370/311 |
| 6,522,638 | B1 | * | 2/2003 | Haugli et al. .................. 370/329 |
| 6,668,159 | B1 | * | 12/2003 | Olofsson et al. ........... 455/67.11 |
| 6,708,037 | B1 | * | 3/2004 | Moulsley et al. ........... 455/452.1 |
| 6,728,233 | B1 | * | 4/2004 | Park et al. ...................... 370/342 |
| 6,850,504 | B1 | * | 2/2005 | Cao et al. ....................... 370/335 |
| 6,859,445 | B1 | * | 2/2005 | Moon et al. .................... 370/335 |
| 6,907,015 | B1 | * | 6/2005 | Moulsley et al. .............. 370/329 |
| 6,963,540 | B2 | * | 11/2005 | Choi et al. ..................... 370/252 |
| 6,973,062 | B1 | * | 12/2005 | Han .............................. 370/335 |

FOREIGN PATENT DOCUMENTS

| EP | 557175 A1 | 8/1993 |
| WO | WO0007401 | 2/2000 |
| WO | WO0013426 | 3/2000 |

* cited by examiner

*Primary Examiner* — Christopher Grey

(57) ABSTRACT

A radio communication system has a random access channel for the transmission of data (214) from a secondary station to a primary station. Such a channel is intended for use by secondary stations having packets of data (214) to transmit to a primary station while not actually engaged in a call. The primary station transmits a random access channel availability (AV) message (302) once per frame to inform secondary stations about the resources currently available. Hence a secondary station can select a channel known to be free. If no channels are available the secondary station can avoid a wasted access attempt.

9 Claims, 2 Drawing Sheets

RADIO COMMUNICATION SYSTEM

The present invention relates to a radio communication system having a random access channel for the transmission of data from a secondary station to a primary station, and further relates to primary and secondary stations for use in such a system and to a method of operating such a system. While the present specification describes a system with particular reference to the emerging Universal Mobile Telecommunication System (UMTS), it is to be understood that the techniques described are equally applicable to use in other mobile radio systems. In this specification the term random access channel refers to the logical channel on which random access transmissions take place, which would typically consist of a number of distinct physical channels.

A random access channel is a normal component of a radio communication system, enabling a Mobile Station (MS) to send short messages to a Base Station (BS). Applications include signalling to the BS when the MS is turned on, sending a packet of data to the BS when the MS may not be engaged in a call, and requesting the BS to allocate a resource for the MS to use.

In a system where mobile stations often have a requirement to send packets of data to the BS when not actually engaged in a call it is advantageous to provide a random access packet channel with similar characteristics to a standard random access channel but intended for the transmission of small and medium sized packets from a MS to the BS.

In an embodiment of a such a scheme developed for UMTS, there are a number of random access packet channels available to a MS. A request for access to a packet channel sent by the MS is encoded with a randomly-chosen signature, which corresponds to one of the packet channels. If the channel is available for use, the BS allocates it to the requesting MS.

Because of the random choice of signature, it is possible that a MS is denied access to its selected packet channel even if there are other suitable channels available for use. This problem can lead to significant delays for a MS, as well as increased interference and loss of capacity.

An object of the present invention is to provide a random access channel having improved throughput and reduced transmission delays.

According to a first aspect of the present invention there is provided a radio communication system comprising a primary station and a plurality of secondary stations and having a random access channel for the transmission of data from a secondary station to the primary station, wherein the primary station has means for transmitting a random access channel status message indicating the availability of random access channel resources and the secondary station has means for receiving the status message and means for using the contents of the message to determine what random access channel resources to request.

According to a second aspect of the present invention there is provided a primary station for use in a radio communication system having a random access channel for the transmission of data from a secondary station to the primary station, wherein means are provided for transmitting a random access channel status message indicating the availability of random access channel resources.

According to a third aspect of the present invention there is provided a secondary station for use in a radio communication system having a random access channel for the transmission of data to a primary station, wherein means are provided for receiving a random access channel status message transmitted by the primary station and for using the contents of the message to determine what random access channel resources to request.

According to a fourth aspect of the present invention there is provided a method of operating a radio communication system having a random access channel for the transmission of data from a secondary station to a primary station, characterised by the primary station transmitting a random access channel status message indicating the availability of random access channel resources and by the secondary station receiving the status message and using the contents of the message to determine what random access channel resources to request.

Embodiments of the present invention will now be described, by way of example, with reference to the accompanying drawings, wherein.

In the drawings the same reference numerals have been used to indicate corresponding features.

Figure 1:
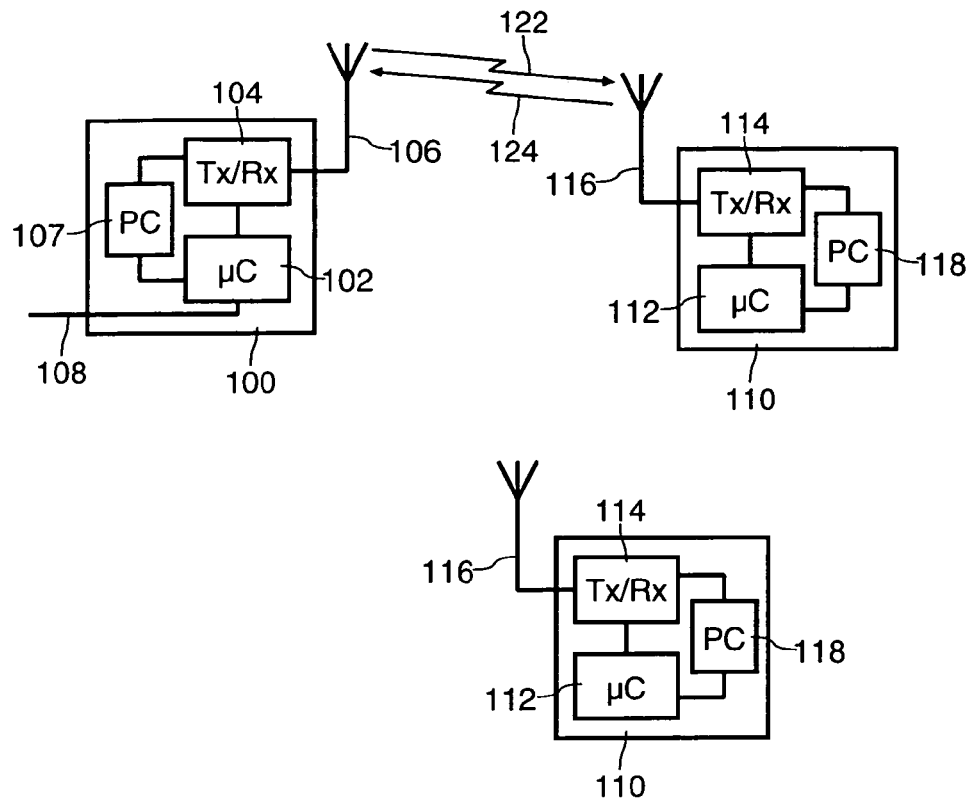
FIG. 1 is a block schematic diagram of a radio communication system.

Referring to FIG. 1, a radio communication system comprises a primary station (BS) 100 and a plurality of secondary stations (MS) 110. The BS 100 comprises a microcontroller (µC) 102, transceiver means (Tx/Rx) 104 connected to antenna means 106, power control means (µC) 107 for altering the transmitted power level, and connection means 108 for connection to the PSTN or other suitable network. Each MS 110 comprises a microcontroller (µC) 112, transceiver means (Tx/Rx) 114 connected to antenna means 116, and power control means (PC) 118 for altering the transmitted power level. Communication from BS 100 to MS 110 takes place on a downlink channel 122, while communication from MS 110 to BS 100 takes place on an uplink channel 124.

Figure 2:
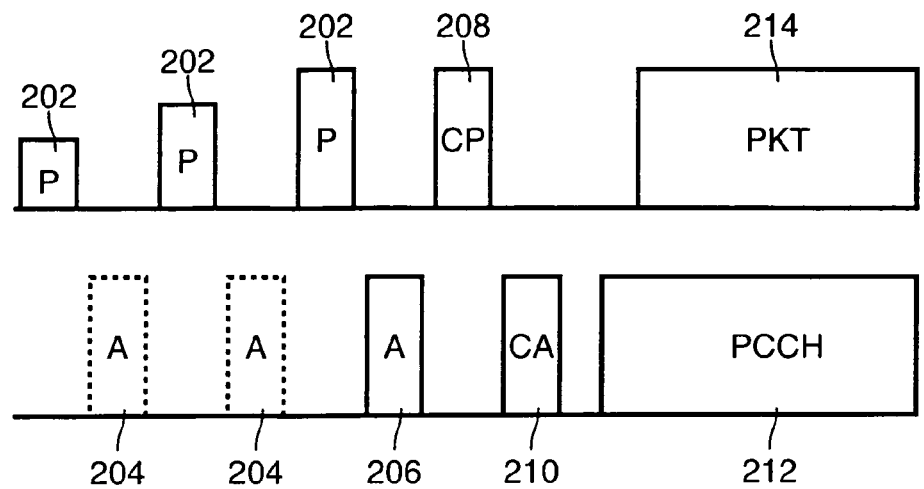
FIG. 2 illustrates a basic random access packet channel scheme.

A basic scheme for a random access packet channel operating in a frequency division duplex system is shown in FIG. 2, with the uplink channel 124 drawn above the downlink channel 122. In an access phase, the MS 110 first transmits a preamble (P) 202, encoded with a signature randomly chosen from a set of 16 possible signatures, at a low power level in a particular access slot. A signature is a signal characterised by its scrambling code and channelisation code modulated by a specific bit sequence. A mutually orthogonal set of signatures can be obtained by defining a set of mutually orthogonal bit sequences for the modulation. Hence, a different set of signatures can be obtained by changing the scrambling code or the channelisation code (i.e. the physical channel), or by using a different mutually orthogonal set of bit sequences. Alternatively a larger set of signatures may be defined in such a way as to have low cross correlations, rather than strict orthogonality. Although the present specification refers to sets of 16 signatures different implementations may use sets having different numbers of signatures.

In this basic scheme the choice of preamble signature for encoding the access preamble 202 determines the physical channel requested by the MS 110, with each preamble signature corresponding to a limited number of uplink and downlink channels. If the BS 100 receives and decodes the preamble correctly it transmits a preamble acknowledgement (A) 206. In the example shown in FIG. 2, after the first preamble 202 is transmitted no acknowledgement is returned in the slot 204 allocated for it (which might typically be 1 ms in length). The MS 110 therefore transmits another preamble 202 at a higher power level. Again no acknowledgement is received in the slot 204, so the MS 110 transmits another preamble 202 at a still higher power. This is received and decoded by the BS 100, which transmits an acknowledgement 206 and thereby completes the access phase.

As well as informing the MS 110 that its preamble 202 has been received, the acknowledgement 206 may be positive, to signal that the requested channels are free, or negative, to signal that they are in use and access is denied to the MS 110. A negative acknowledgement (NACK) may be indicated by the BS 100 inverting the phase of the signature (with respect to some reference or pilot signal). Alternatively, some of the signatures used by the BS 100 for acknowledgement may also be used as a NACK.

The BS 100 will only transmit one acknowledgement for each access slot, however many preambles 202 were transmitted. One basis for the selection could be to acknowledge the preamble 202 received with the highest power. The initial power level at which a MS 110 transmits the preamble 202 is typically determined by the MS 110 using open loop power control, so that a MS 110 is not at a disadvantage compared to another MS 110 nearer to the BS 100. If more than one preamble 202 was transmitted but each preamble was encoded with a different signature then each MS 110 will know whether or not its preamble 202 was received correctly. However, it is possible that more than one MS 110 selected the same signature, and therefore believes that its preamble 202 has been received. If each of these mobile stations 110 begins to transmit its data the result will be a collision, with none of the data likely to be received correctly.

To reduce the chances of this happening, a contention resolution phase follows the transmission of an acknowledgement 206 which indicated that the requested channels were free. Each MS 110 which transmitted a preamble 202 encoded with a signature corresponding to that acknowledged by the BS 100 now transmits a further contention resolution preamble (CP) 208. This preamble 208 is encoded with a signature randomly selected from another set of 16 possible signatures. This set may be different from the set used for the access preamble 202 (either by changing the set of modulating bit sequences, the scrambling code or the channelisation code), or alternatively the set of signatures may be shared between access and contention resolution phases. The BS 100 then issues a contention resolution acknowledgement (CA) 210 corresponding to the selected preamble 208, for example that received with the highest power, which acknowledgement 210 enables the MS 110 to transmit its data. Hence, if more than one MS 110 selected the same access preamble 202 the chance of the same contention resolution preamble 208 also being selected is small.

After this contention resolution phase the BS 100 begins transmission of a Physical Control CHannel (PCCH) 212, which includes power control information to instruct the MS 110 to adjust its transmission power as necessary, and the MS 110 transmits one or more data packets (PKT) 214 on the allocated packet channel, which is normally on a different physical channel to those used for the preamble transmissions. The PCCH 212 may begin simultaneously with the transmission of the data 214, or may precede it sufficiently for closed loop power control to be established before the data transmission.

A particular problem with the basic scheme described above is that a MS 110 may be denied access to a packet channel corresponding to its selected preamble signature, even though other suitable channels may be available. This makes it likely that a MS 110 will spend significant time waiting for a channel to become available, particularly when traffic loading is high.

It is therefore beneficial if a MS 110 can determine what packet channel resources are available (if any) before attempting to send a packet, and also to help in selecting an appropriate preamble signature. One known way in which this can be done is for the MS 110 to monitor system activity, for example by listening for access preambles 202 and acknowledgements 206, for an extended period before packet transmission. However, this leads to significant transmission delays for the MS 110, and the information may not be completely reliable (since the MS 110 may not be able to receive all the preambles 202 and acknowledgements 206 transmitted in a cell).

Figure 3:
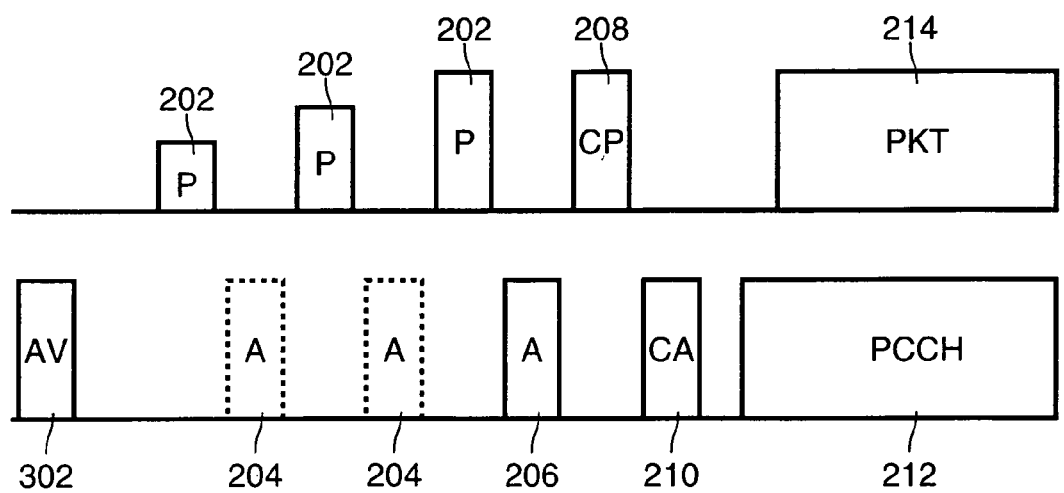
FIG. 3 illustrates an enhanced random access packet channel scheme having a packet channel availability message.

An improved system, in accordance with the present invention, is shown in FIG. 3 in which the BS 100 repeatedly broadcasts a packet channel availability (AV) message 302, which informs a MS 110 about the resources currently available. Broadcasting the AV message 302 once per frame is a reasonable compromise between downlink overhead and delay, since the overall transmission delay will be dominated by the time taken to transmit the data packets 214, typically a few frames. If necessary, the AV message 302 could probably be broadcast less often without major impact. A system supporting up to 16 packet channels would require 16 bits of status information per AV message 302 to indicate the availability of each channel individually.

By preventing the MS 110 from attempting to transmit unless it has an indication that a suitable resource is available, interference is minimised and the MS 110 saves power. These modifications will increase the overall throughput of the packet channel under high load conditions.

A further improvement is possible in a system in which channel assignment is carried out at the end of contention resolution. Such a system is disclosed in our co-pending UK Patent Application 0000293.1 (our reference PHGB 000003). In such a system it is only necessary to indicate whether a particular bit rate is available. For example, if there are six available bit rates (such as 60, 120, 240, 480, 960 and 1920 kbps), six bits are needed to indicate the availability of each.

This can be reduced still further by adding a bit rate of 0 to the set and only broadcasting the maximum available bit rate (with a bit rate of 0 indicating that no resources are available). Then, assuming that any bit rate below the maximum available can be supported, only three bits are required.

A particularly convenient location for this message in a UMTS embodiment is as part of a paging indicator channel (PICH), which channel is used to inform a MS 110 that there is a message waiting for it. The channel has the capacity to transmit 300 bits per 10 ms frame, but only 288 are required for paging indication messages. The remaining 12 bits per frame could be used to transmit an AV message 302. Alternatively, the AV message 302 could be transmitted as paging messages, or in another physical channel having the same channelisation code as the PICH but only occupying the space left by the unused bits in the PICH, or as part of any other channel having similar characteristics.

If the AV message 302 is transmitted as part of a PICH it is useful to allow a power offset between the page indication bits and the AV bits. This could allow for different quality of service requirements for the two types of information, as well as the possibility that each has different degrees of repetition coding applied. If a 3 bit AV message 302 is sent in the unused bits of a PICH, 4 times repetition coding could be applied. If a format of AV message 302 requiring more than 12 bits is selected then the message could be split, for example over two frames.

Another possible location in a UMTS embodiment is in the unused space of an Acquisition Indicator Channel (AICH), or possibly as part of the same channel. This channel transmits 300 symbols over 2 frames (20 ms), but 60 symbols are unused (in 15 groups of 4 symbols). Thus the AV message 302 could be distributed over 1 or 2 frames with suitable repetition coding (depending on the number of bits in the message).

The AV message 302 is preferably sent regularly. In some circumstances exact regularity may not be possible. For example if the number of bits in the AV message 302 is not an exact sub-multiple of the number of bits available in the desired transmission period, some special measures may be needed. Some bits could be left unused. Another possibility would be to change dynamically the number of repetitions applied to the AV message 302, which would lead to variation in the interval between transmissions of the AV message. Yet another possibility is that different parts of the message may have different repetition factors, to allow the transmission interval to be filled.

The BS 100 may inform the MS 110 of the power level of the AV message 302 in order to aid more reliable detection. Such information could be sent on a common broadcast channel (BCH). The power level may be specified in relation to some other downlink channel such as a common pilot channel (CPICH).

Figure 4:
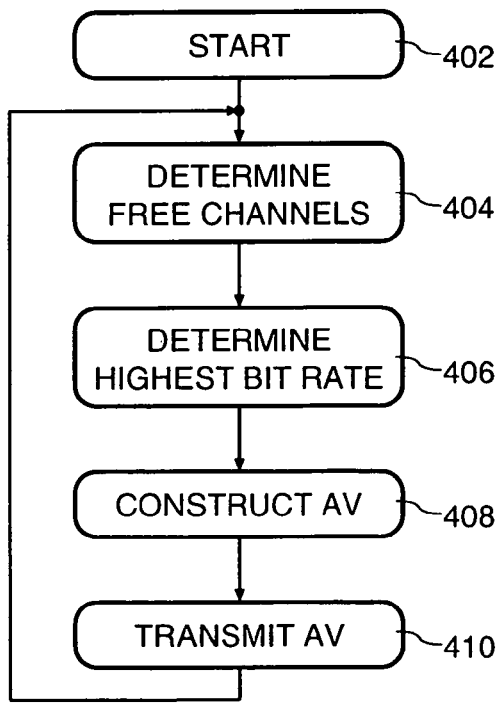
FIG. 4 is a flow chart illustrating a method in accordance with the present invention for broadcasting random access packet channel availability information.

A flow chart summarising a method in accordance with the present invention for a BS 100 broadcasting an AV message 302 is shown in FIG. 4. The method starts, at step 402, when the BS 100 activates a random access packet channel. At step 404 the BS 100 determines which of the potentially available packet channels are not in use. From this information the BS 100 determines, at step 406, the highest bit rate available to a MS 110 having data for transmission on the random access packet channel. The BS 100 then uses this information to construct an AV message 302, which it transmits at step 410. Steps 404 to 410 are then repeated, typically once per frame.

A particular advantage of a method in accordance with the present invention is that the BS 100 has the flexibility to assign bit rates to channels only when they are requested, rather than pre-assigning bit rates to channels in the hope that the assignment will meet traffic requirements. The BS 100 may limit the bit rate indicated in an AV message 302, even if capacity is currently available, if such capacity may be required for other purposes.

As well as its application in a FDD system as described above, the present invention could be applied in other types of communication system. For example, it could be used in a Time Division Multiple Access (TDMA) system provided that the uplink transmissions take place in different time slots to the downlink transmissions.

The embodiments described above relate to packet transmission. However, the same principles can equally well be applied to a system in which circuits are set up for data transmission.

From reading the present disclosure, other modifications will be apparent to persons skilled in the art. Such modifications may involve other features which are already known in the design, manufacture and use of radio communication systems and component parts thereof, and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of features during the prosecution of the present application or of any further application derived therefrom.

In the present specification and claims the word "a" or "an" preceding an element does not exclude the presence of a plurality of such elements. Further, the word "comprising" does not exclude the presence of other elements or steps than those listed.

The invention claimed is:

1. A radio communication system, comprising:
a primary station operable to transmit a random access channel status message, the status message including an indicated highest available data rate on a plurality of available random access channels; and
a plurality of secondary stations operable to receive the random access channel status message,
wherein each secondary station is operable to determine which random access channel to request based on the random access channel status message;
wherein the highest available data bit rate of the random access channel status message is indicated for each of the plurality of available random access channels in order to enable each secondary station to determine which random access channel to request;
wherein the indicated highest available data rate of at least one available random access channel is lower than a highest data rate that is available to the at least one random access channel, based on a potential future demand for capacity; and
wherein the primary station is operable to repeatedly transmit the random access channel status message so that intervals between repeated random access channel status messages are different.

2. The radio communication system of claim 1, wherein the random access channel status message is transmitted by said primary station as a part of a paging indicator channel.

3. The radio communication system of claim 1, wherein the random access channel status message is transmitted by said primary station as a part of an acquisition indicator channel.

4. The radio communication system of claim 1, wherein the indicated highest available data rate serves to identify whether the corresponding random access channel is available, and identifies a highest available data rate for available channels of the plurality of random access channels.

5. The radio communication system of claim 1, wherein the primary station is operable to transmit different parts of the random access channel status message at different repetition factors.

6. A radio communication method, comprising the acts of:
transmitting, from a primary station, a random access channel status message, the status message including an indicated highest available data rate on a plurality of available random access channels;
receiving, at each of a plurality of secondary stations, the random access channel status message;
selecting, at each secondary station, a selected random access channel based on the received random access channel status message;
requesting, by each secondary station, the selected random access channel from the primary station;

wherein the highest available bit rate of the random access channel status message is indicated for each of the plurality of available random access channels in order to enable each secondary station to determine which random access channel to request, and wherein the indicated highest available data rate of at least one available random access channel is lower than a highest data rate that is available to the at least one random access channel, based on a potential future demand for capacity; and wherein the primary station operable to repeatedly transmit the random access channel status message so that intervals between repeated random access channel status messages are different.

7. The radio communication method of claim 6, wherein the random access channel status message is transmitted by the primary station as a part of a paging indicator channel.

8. The radio communication method of claim 6, wherein the random access channel status message is transmitted by the primary station as a part of an acquisition indicator channel.

9. The radio communication method of claim 6, wherein the transmitting act transmits different parts of the random access channel status message at different repetition factors.

* * * * *